(12) United States Patent
Choi et al.

(10) Patent No.: US 7,981,953 B2
(45) Date of Patent: Jul. 19, 2011

(54) FLAME RETARDANT RUBBER-MODIFIED STYRENE RESIN COMPOSITION

(75) Inventors: Jong-kuk Choi, Gwangju-si (KR); Dae-san Jung, Daejeon (KR); Sung-ho Lee, Daejeon (KR); Yong-yeon Hwang, Daejeon (KR); Boo-ho Seo, Daejeon (KR)

(73) Assignee: LG Chem, Ltd. (KR)

( * ) Notice: Subject to any disclaimer, the term of this patent is extended or adjusted under 35 U.S.C. 154(b) by 48 days.

(21) Appl. No.: 11/608,026

(22) Filed: Dec. 7, 2006

(65) Prior Publication Data

US 2008/0004378 A1    Jan. 3, 2008

(30) Foreign Application Priority Data

Jun. 29, 2006    (KR) .................. 10-2006-0059559

(51) Int. Cl.
*C07F 9/09* (2006.01)
(52) U.S. Cl. ........................................ 524/127
(58) Field of Classification Search .............. 524/127
See application file for complete search history.

(56) References Cited

U.S. PATENT DOCUMENTS

| 3,639,506 | A | | 2/1972 | Haaf | |
|---|---|---|---|---|---|
| 3,883,613 | A | | 5/1975 | Cooper | |
| 4,172,858 | A | * | 10/1979 | Clubley et al. | 524/145 |
| 4,729,854 | A | * | 3/1988 | Miyata et al. | 252/609 |
| 6,124,385 | A | | 9/2000 | Honl et al. | |
| 6,316,579 | B1 | * | 11/2001 | Katayama et al. | 528/196 |
| 7,244,786 | B2 | * | 7/2007 | Matsumoto et al. | 525/107 |
| 2004/0167240 | A1 | * | 8/2004 | Burgun et al. | 521/79 |
| 2005/0020737 | A1 | * | 1/2005 | Jung et al. | 524/86 |
| 2006/0100393 | A1 | * | 5/2006 | Hale et al. | 525/439 |

FOREIGN PATENT DOCUMENTS

| JP | 5179064 | 7/1993 |
|---|---|---|
| JP | 9188791 | 7/1997 |
| JP | 2003201385 | 7/2003 |
| JP | 790148 | 7/2007 |
| KR | 1020050070981 | 7/2005 |

* cited by examiner

*Primary Examiner* — Milton I Cano
*Assistant Examiner* — John Uselding
(74) *Attorney, Agent, or Firm* — Cantor Colburn LLP

(57) ABSTRACT

The present invention relates to a flame retardant rubber-modified styrene resin composition having excellent flame resistance for dripping without containing halogens and phenylene ether, which comprises A) 100 weight part of a rubber-modified polystyrene; B) 1~10 weight part of a phosphoric ester compound; and C) 0.1~10 weight part of an aliphatic amide compound. The flame retardant rubber-modified styrene resin composition of the present invention has flame resistance at the level of UL-94 V-2 and excellent impact resistance, heat resistance and fluidity.

2 Claims, No Drawings

FLAME RETARDANT RUBBER-MODIFIED STYRENE RESIN COMPOSITION

This application claims the benefit of the filing date of Korean patent Application Nos. 10-2006-0059559 filed on Jun. 29, 2006 in the Korean Intellectual Property Office, the disclosure of which is incorporated herein in its entirety by reference.

TECHNICAL FIELD

The present invention relates to a flame retardant rubber-modified styrene resin composition, and more precisely a flame retardant non-halogen rubber-modified styrene resin composition with improved flame resistance for dripping, impact resistance, heat resistance and fluidity without using a halogen flame retardant and polyphenylene ether.

BACKGROUND ART

Rubber-modified styrene resin, a representative impact resistant polystyrene resin, is characterized by excellent plasticity, strength, and electrical properties. Owing to these characteristics, this resin has been widely applied to various industrial fields including office automation devices such as word-processors, personal computers, printers, copiers, etc; home electronic appliances such as TVs, VCRs, audio systems, etc; electronic parts; and auto parts.

Even with these excellent plasticity and mechanical properties, the flammable rubber-modified styrene resin has a safety problem. Therefore, efforts have been continuously made to develop a flame retardant rubber-modified styrene resin. The flame resistance has been controlled by UL and the method in which halogen flame-retardants are mixed with styrene resin together with a flame retardant auxiliary has been the most commonly accepted. The halogen flame-retardant is selected from a group consisting of polybromodiphenylether, tetrabromobisphenol A, Br-substituted epoxy compound and chlorinated polyethylene. The flame retardant auxiliary is an antimony compound such as antimony trioxide and antimony pentoxide.

The method of generating flame-resistance by mixing a halogen flame retardant with the antimony flame retardant auxiliary has been successful at endowing excellent flame-resistance without damaging the mechanical properties, but there are chances of damaging the mold from hydrogen halide during the processing, and producing dioxin, a strong carcinogen, from the waste incineration, causing environmental and biological problems. Recently, actions have been taken to restrict such halogen flame retardants and thus there is a need to develop a flame retardant resin excluding halogen elements.

To endow flame resistance to a rubber-modified styrene resin that does not include halogen elements, a rubber-modified styrene resin has been blended with polyphenylene ether, which is expected to improve flame resistance and heat resistance.

U.S. Pat. No. 3,639,506 and No. 3,883,613 describe that it is effective to add an aromatic phosphoric ester such as triphenylphosphate and trimesitylphosphate as a flame retardant to the blend of rubber-modified styrene resin and polyphenylene ether resin. U.S. Pat. No. 6,124,385 describes that flame resistance is improved by adding a free radical generator and triphenylphosphate or triphenylphosphineoxide alone or together to the mixture of rubber-modified styrene resin and polyphenylene ether resin.

During the processing of the polyphenylene ether and rubber-modified styrene blend into a flame-retardant resin, the processing temperature is high because of the heat-resistant polyphenylene ether and the screw has to be separately designed to handle the huge shear force. At this time, if the processing temperature is 250° C. or higher, the low molecular aromatic phosphoric ester will evaporate, suggesting that the final content of the compound in the final resin is much less than at the early stage, so flame resistance and the physical properties will be altered. An increase of polyphenylene ether content is a disadvantage for preparing a flame retardant resin for dripping because the over-dose of polyphenylene ether inhibits the dripping of the flame retardant resin.

In the course of studies on the development of a flame retardant rubber-modified styrene resin with excellent flame resistance for dripping and without polyphenylene ether to overcome the above problems, the present inventors completed this invention by confirming that the flame resistance for dripping of a resin is greatly improved when a phosphoric ester compound is used as a flame retardant and an aliphatic amide compound is used as a dripping enhancer without damaging heat resistance and fluidity.

DISCLOSURE OF THE INVENTION

It is an object of the present invention to provide a rubber-modified styrene resin having excellent flame resistance for dripping without using polyphenylene ether. It is another object of the present invention to provide a flame-retardant rubber-styrene resin having excellent physical properties including heat resistance, impact resistance and fluidity.

The above object and other objects of the present invention can be achieved by the following embodiments of the present invention.

To achieve the objects of the present invention, an embodiment of the present invention provides a flame-retardant rubber-modified styrene resin composition that characteristically contains:

A) 100 weight part of a rubber-modified styrene copolymer;

B) 1~10 weight part of a non-halogen phosphoric ester compound as a flame-retardant; and C) 0.1~10 weight part of an aliphatic amide compound as a dripping enhancer.

The present invention is described in detail hereinafter.

A) Rubber-Modified Styrene Copolymer

The rubber-modified styrene copolymer of the present invention is a major component of the resin composition, which plays a role in supporting the molded goods. The rubber-modified styrene resin has a structure such that rubber polymer particles are dispersed on a matrix composed of a copolymer of a vinyl aromatic polymer and any compound that is able to be copolymerized with the vinyl aromatic polymer. Polymerization is performed by either bulk polymerization, suspension polymerization or emulsion polymerization, and bulk polymerization is more preferred. When bulk polymerization is performed, a rubber polymer is dissolved in a vinyl aromatic monomer followed by stirring and then a polymerization initiator is added thereto.

The vinyl aromatic monomer used to produce the rubber-modified styrene copolymer is largely a styrene compound. In addition to the styrene compound, nucleus alkyl substituted styrene such as p-methylstyrene, 2,4-dimethylstyrene or α-ethylstyrene; methylstyrene or α-alkyl substituted styrene such as α-methyl-p-methylstyrene can be used as the vinyl aromatic compound of the present invention. The styrene compound can be used alone or in a mixture of at least two compounds.

The rubber polymer used for the rubber-modified styrene copolymer is selected from a group consisting of acrylate or methacrylate containing rubber polymers; polybutadiene or styrene-butadiene-styrene copolymer; styrene-butadiene copolymer; polyisoprene or butadiene-isoprene copolymer; and natural rubber. Polybutadiene or styrene-butadiene copolymer is preferred, and polybutadiene is more preferred.

B) Phosphoric Ester Compound

The phosphoric ester compound is used in the present invention to improve the flame-resistance of a rubber-modified styrene copolymer, and is selected from a group consisting of trialkylphosphate without halogen substitution such as trimethylphosphate, triethylphosphate, tributylphosphate and trioctylphosphate; a triarylphosphate such as triphenylphosphate, tricresylphosphate, trixylenylphosphate and cresyldiphenylphosphate; a trialkyl-arylphosphate such as octyldiphenylphosphate; and an aromatic diphosphate represented by the following formula 1. Among these compounds, triarylphosphate is preferred and triphenylphosphate, tri(4-methylphenyl)phosphate or tri(2,6-dimethylphenyl)phosphate is more preferred.

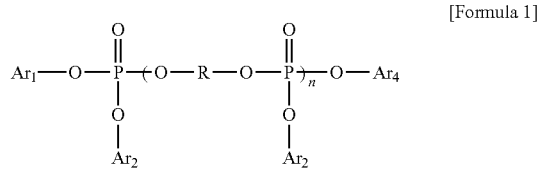

[Formula 1]

Wherein, $Ar_1 \sim Ar_4$ are phenyl or aryl with the substitution of 1~3 C1~C4 alkyl, R is phenyl or bisphenol A, and n is the degree of polymerization.

The preferable content of the phosphoric ester compound in 100 weight part of the rubber-modified styrene copolymer is 1~10 weight part. If the content of the flame retardant is less than 1 weight part, the flame retardant effect will be reduced. Also, if the content of the flame retardant is more than 10 weight part, heat resistance will be reduced seriously.

C) Aliphatic Amide Compound

The aliphatic amide compound used in the present invention, which is represented by formula 2 or 3, plays a role in improving the dripping of a flame retardant rubber-modified styrene resin, which is exemplified by stearamide, oleamide, erucamide, ethylene bis stearamide, ethylene bis oleamide, etc. Particularly, ethylene bis stearamide is preferably used.

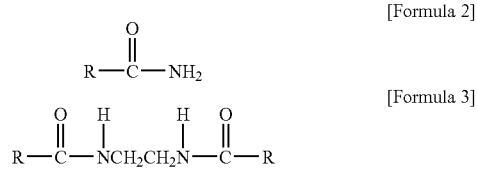

[Formula 2]

[Formula 3]

Wherein, R is $C_{12} \sim C_{22}$ alkyl.

The preferable content of the aliphatic amide compound in 100 weight part of rubber-modified styrene copolymer is 0.1~10 weight part. If the content of such a dripping enhancer is less than 0.1 weight part, dripping property will not be enhanced. In the meantime, if the content is more than 10 weight part, heat resistance and thermostability will be reduced.

The flame retardant rubber-modified styrene resin composition of the present invention can additionally include antioxidants, heat stabilizers, photo stabilizers, lubricants, anti-dripping agents, inorganic fillers, pigments, etc.

BEST MODE FOR CARRYING OUT THE INVENTION

Practical and presently preferred embodiments of the present invention are illustrated as shown in the following examples.

However, it will be appreciated that those skilled in the art, on consideration of this disclosure, may make modifications and improvements within the spirit and scope of the present invention.

EXAMPLES

Example 1

Preparation of Rubber-Modified Styrene Resin

A monomer mixture composed of 8 weight part of butadiene rubber, 77 weight part of styrene and 15 weight part of ethylbenzene was prepared, to which 0.02 weight part of 1,1-bis(t-butyl peroxy)-3,3,5-trimethyl cyclohexane was added as a polymerization initiator. The mixture was put in a continuous polymerizing apparatus wherein 4 stirred tank reactors were serially connected, followed by continuous graft copolymerization. The temperature at the entrance of the polymerizing apparatus was 125° C., and the temperature at the exit was 140° C. The final copolymerization solution was transferred into the devolatilizing tank, where non-reacted monomers and solvent were eliminated at 230° C. under 20 torr, followed by pelleting to give a rubber-modified styrene resin (HIPS) containing 8 weight % of rubber.

Preparation of Flame Retardant Rubber-Modified Styrene Resin

To 100 weight part of the rubber-modified styrene resin prepared above were added 3 weight part of triphenylphosphate (Daihachi, Japan), a flame retardant, 3 weight part of ethylene bis stearamide as a dripping enhancer (Sunkoo Chem., Korea), and 0.3 weight part of an antioxidant (Ciba Specialty Chemicals iganox 1076). The above compounds were mixed well in a Henschel mixer, followed by extrusion at 210° C. using a twin screw extruder to prepare a pellet. The final sample was prepared by injecting.

Example 2

A flame retardant rubber-modified styrene resin was prepared in the same manner as described in Example 1 except that 0.5 weight part of stearamide (Akzo) was used as a dripping enhancer.

Example 3

A flame retardant rubber-modified styrene resin was prepared in the same manner as described in Example 1 except that 7 weight part of resorcinol tetraxylyloxy diphosphate PX-200 (Daihachi, Japan) was used as a flame retardant and 5 weight part of ethylene bis stearamide (Sunkoo chem., Korea) was used as a dripping enhancer.

Comparative Example 1

A flame retardant rubber-modified styrene resin was prepared in the same manner as described in Example 1 except that 80 weight part of the rubber-modified styrene resin and 20 weight part of polyethylene ether were used and extrusion was performed at 250° C. without using a dripping enhancer.

Comparative Example 2

A flame retardant rubber-modified styrene resin was prepared in the same manner as described in Example 1 except that 3 weight part of triphenylphosphate was used and a dripping enhancer was not used.

Comparative Example 3

A flame retardant rubber-modified styrene resin was prepared in the same manner as described in Example 1 except that 15 weight part of triphenylphosphate was used and a dripping enhancer was not used.

Comparative Example 4

A flame retardant rubber-modified styrene resin was prepared in the same manner as described in Example 1 except that 12 weight part of ethylene bis stearamide was used.

Comparative Example 5

A flame retardant rubber-modified styrene resin was prepared in the same manner as described in Example 1 except that 3 weight part of zinc stearate was used as a dripping enhancer.

Comparative Example 6

A flame retardant rubber-modified styrene resin was prepared in the same manner as described in Example 1 except that 3 weight part of polyethylene wax was used as a dripping enhancer.

Comparative Example 7

A flame retardant rubber-modified styrene resin was prepared in the same manner as described in Example 1 except that 3 weight part of fatty acid ester compound was used as a dripping enhancer.

Experimental Example

The flame retardant rubber-modified styrene resins prepared in Examples 1~3 and Comparative Examples 1~7 were tested for impact resistance and weather resistance as follows.

a) Flammability—tested with ⅛" bar sample according to the UL94 VB flammability test method b) Impact resistance—tested with ⅛" notch sample according to ASTM D256 by measuring izod impact strength (kg·cm/cm).

c) Heat resistance—tested with ¼" sample according to ASTM D648 by measuring heat distortion temperature (HDT).

d) Fluidity—tested under the conditions of 200° C. and 5 kg according to ASTM D1238.

The flame resistance and physical properties measured by the above methods are shown in Table 1.

TABLE 1

| | | Example | | | Comparative Example | | | | | | |
|---|---|---|---|---|---|---|---|---|---|---|---|
| | | 1 | 2 | 3 | 1 | 2 | 3 | 4 | 5 | 6 | 7 |
| HIPS | | 100 | 100 | 100 | 80 | 100 | 100 | 100 | 100 | 100 | 100 |
| PPE | | — | — | — | 20 | — | — | — | — | — | — |
| Phosphoric ester compound | TPP | 3 | 3 | — | 3 | 3 | 15 | 3 | 3 | 3 | 3 |
| | PX-200 | — | — | 7 | — | — | — | — | — | — | — |
| Aliphatic amide compound | Stearamide | — | 0.5 | — | — | — | — | — | — | — | — |
| | EBS | 3 | — | 5 | — | — | — | 12 | — | — | — |
| Zinc stearate | | — | — | — | — | — | — | — | 3 | — | — |
| PE wax | | — | — | — | — | — | — | — | — | 3 | — |
| Fatty acid ester | | — | — | — | — | — | — | — | — | — | 3 |
| Heat stabilizer | | 0.3 | 0.3 | 0.3 | 0.3 | 0.3 | 0.3 | 0.3 | 0.3 | 0.3 | 0.3 |
| Izod impact strength (kgfcm/cm, ⅛") | | 14 | 13 | 12 | 16 | 15 | 13 | 12 | 15 | 15 | 14 |
| Heat distortion temperature (° C.) | | 76 | 77 | 75 | 81 | 77 | 61 | 63 | 77 | 76 | 77 |
| Melt index (g/min) | | 15 | 13 | 18 | 5 | 14 | 45 | 34 | 13 | 12 | 16 |
| Flammability (⅛") | | V-2 | V-2 | V-2 | V-2 | N/R | V-2 | V-2 | N/R | N/R | N/R |
| Total burning time (sec) | | 28 | 34 | 26 | 47 | — | 23 | 35 | — | — | — |

\* N/R: No Rating

\* EBS: ethylene bis stearamide

As shown in Table 1, the flame retardant rubber styrene resins of Examples 1~3, which were prepared with the addition of a phosphoric ester compound as a flame retardant and aliphatic amide compound a dripping regulator without polyphenylene ether, were confirmed to have stable flame resistance according to UL-94 V-2 and maintained an excellent balance among the mechanical properties including impact resistance, heat resistance and fluidity.

Particularly, the flame retardant rubber-modified styrene resin of Comparative Example 1 had flame resistance for dripping but the total burning time was longer with reduced fluidity. In the meantime, the resins of Comparative Examples 2, 5, 6 and 7 wherein a dripping regulator was not included and a non-aliphatic amide lubricant was included had excellent mechanical properties but unsatisfactory flame resistance. As shown in Comparative Examples 3 and 4, excellent flame resistance for dripping can be achieved by the over-use of a phosphoric ester compound and aliphatic amide compound, which has the disadvantage of a serious reduction in heat resistance.

INDUSTRIAL APPLICABILITY

As explained hereinbefore, the flame retardant rubber-modified styrene resin composition of the present invention can maintain flame resistance according to UL-94 V-2 without any halogen compound or polyphenylene ether and has excellent impact resistance, heat resistance and fluidity. The flame retardant rubber-modified styrene resin composition of the present invention can be applied to various fields particularly to OA devices and TV housings, owing to the slight chance of outward inferiority under various molding conditions.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A flame retardant rubber-modified styrene resin composition consisting of:
A) 100 weight part of a rubber-modified styrene copolymer; wherein the rubber-modified styrene copolymer has such a structure that rubber polymer particles are dispersed in a matrix composed of a copolymer of a vinyl aromatic compound and compound copolymerizible with a vinyl aromatic compound;
B) 3 ~7 weight part of a non-halogen phosphoric ester compound as a flame-retardant wherein the non-halogen phosphoric ester compound is a triphenylphosphate, or an aromatic diphosphate represented by formula 1; and
C) 0.5 ~5 weight part of an aliphatic amide compound as a dripping enhancer, wherein the aliphatic amide compound is one or more compounds selected from the group consisting of stearamide, and ethylene bis stearamide,
wherein the flame retardant rubber-modified styrene resin composition has flame retardancy of V-2 according to UL-94;

[Formula 1]

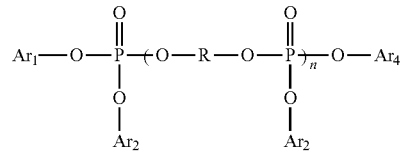

wherein, $Ar_1$ ~$Ar_4$ are phenyl or aryl with the substitution of 1 ~3 C1 ~C4 alkyl, R is phenyl or bisphenol A, and n is the degree of polymerization.

2. The flame retardant rubber-modified styrene resin composition according to claim 1, wherein the rubber polymer is one or more compounds selected from a group consisting of acrylate or methacrylate containing rubber polymers; polybutadiene; styrene-butadiene-styrene copolymer; styrene-butadiene copolymer; polyisoprene; butadiene-isoprene copolymer; and natural rubber.

* * * * *